(12) United States Patent  (10) Patent No.: US 7,988,077 B2
Lin  (45) Date of Patent: Aug. 2, 2011

(54) CONNECTING APPARATUS ADAPTED IN A CONJUNCTIVE STRUCTURE

(75) Inventor: Chun-Wang Lin, Taipei County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 263 days.

(21) Appl. No.: 12/071,758

(22) Filed: Feb. 26, 2008

(65) Prior Publication Data

US 2009/0128957 A1  May 21, 2009

(30) Foreign Application Priority Data

Nov. 19, 2007 (TW) .............................. 96219527 U

(51) Int. Cl.
*B02C 25/00* (2006.01)
(52) U.S. Cl. ......................................... 241/30; 241/301
(58) Field of Classification Search .................... 241/30, 241/301

See application file for complete search history.

(56) References Cited

U.S. PATENT DOCUMENTS

| 4,109,296 A * | 8/1978 | Rostek et al. ................. 361/763 |
| 4,918,847 A * | 4/1990 | Lee .................................. 40/745 |
| 6,244,480 B1 * | 6/2001 | Sepulveda et al. ............. 223/120 |
| 7,484,326 B2 * | 2/2009 | Tamura et al. .................. 40/748 |
| 2004/0100778 A1 * | 5/2004 | Vinciarelli et al. ........... 361/760 |
| 2005/0193614 A1 * | 9/2005 | Conrad ........................... 40/757 |
| 2008/0112139 A1 * | 5/2008 | Vinciarelli et al. ........... 361/709 |

* cited by examiner

*Primary Examiner* — Bena Miller
(74) *Attorney, Agent, or Firm* — Rabin & Berdo, PC

(57) ABSTRACT

A connecting apparatus adapted in a conjunctive structure is provided. The conjunctive structure comprises a baseboard, a peripheral element and a connecting apparatus. The connecting apparatus comprises at least one first connecting element and at least one second connecting element. The first connecting element is a magnetic element and is placed on one corner of the peripheral element. The second connecting element is placed around a hole of the baseboard, and the second connecting element comprises two adjacent magnetic elements with opposite polarity arrangement.

5 Claims, 3 Drawing Sheets ize of the electronic products. For example, the ultra mobile personal computers, cell phones and personal digital assistants are widely used portable devices. The shrinking size of the devices brings convenience to people, but it also brings challenges to electronic technology.

CONNECTING APPARATUS ADAPTED IN A CONJUNCTIVE STRUCTURE

RELATED APPLICATIONS

This application claims priority to Taiwan Application Serial Number 96219527, filed Nov. 19, 2007, which is herein incorporated by reference.

FIELD OF INVENTION

The present invention relates to a connecting apparatus. More particularly, the present invention relates to a connecting apparatus adapted in a conjunctive structure.

DESCRIPTION OF RELATED ART

Modern electronic technology shrinks the size of the electronic products. For example, the ultra mobile personal computers, cell phones and personal digital assistants are widely used portable devices. The shrinking size of the devices brings convenience to people, but it also brings challenges to electronic technology.

The portable devices described above often have to be connected to other devices to provide specific functions. For example, the ultra mobile personal computers are connected to collapsible keyboard to input data; cell phones and personal digital assistants are connected to the charging cradle to charge the batteries. The connecting apparatus described above are usually designed too complicated to operate easily. Furthermore, the cost to make such apparatus is high.

Accordingly, what is needed is a connecting apparatus with simple design and low cost to overcome the above issues. The present invention addresses such a need.

SUMMARY

The invention provides a connecting apparatus comprising at least one first connecting element and at least one second connecting element. The at least one first connecting element is a magnetic element and is placed on one corner of the peripheral element; the at least one second connecting element is placed around a hole of the baseboard corresponding to the first connecting element, the second connecting element comprises two adjacent magnetic elements with opposite polarity arrangement.

Another objective of this invention is to provide a conjunctive structure comprising a baseboard, a peripheral element and a connecting apparatus. The baseboard comprising a hole; the peripheral element comprises a bulge, wherein the shape and the size of the bulge is compatible to the hole of the baseboard; and the connecting apparatus comprising at least one first connecting element and at least one second connecting element, wherein the at least one first connecting element is a magnetic element placed on one corner of the peripheral element; the at least one second connecting element placed around a hole of the baseboard corresponding to the at least one first connecting element, the at least one second connecting element comprises two adjacent magnetic elements with opposite polarity arrangement.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
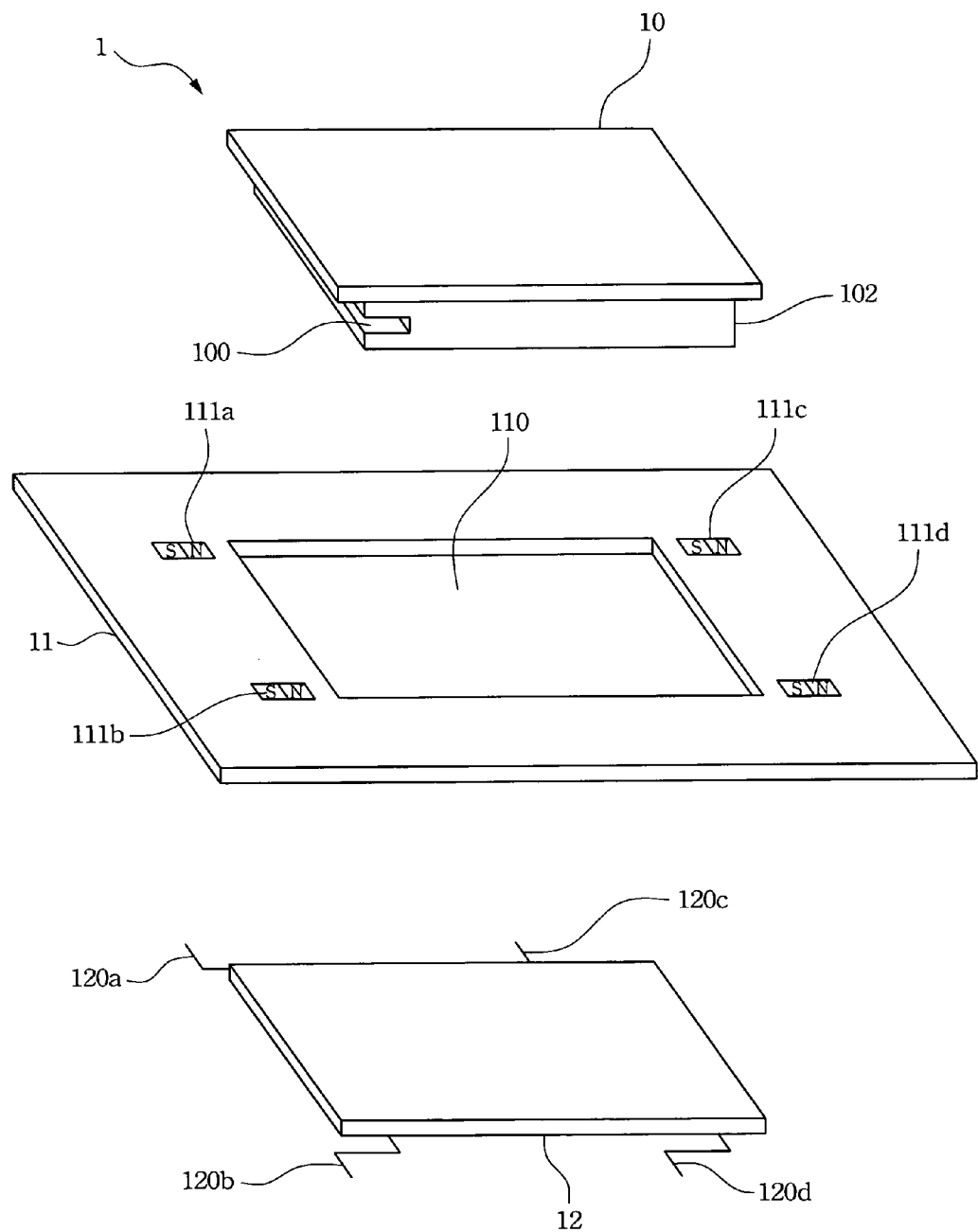
FIG. 1 is an exploded view of an embodiment of the invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, an exploded view of an embodiment of the present invention. A conjunctive structure 1 comprises a baseboard 11 with a hole 110 at the center, a peripheral element 10, a supporting board 12 and a connecting apparatus. The connecting apparatus comprises four first magnetic connecting elements 101a, 101b, 101c, and 101d those are placed on the four corners of the peripheral element 10; and four second magnetic connecting elements 111a, 111b, 111c, and 111d those are placed around the hole 110 of the baseboard 11 corresponding to the four first magnetic connecting elements 101a, 101b, 101c, and 101d, respectively. The peripheral element 10 comprising a bulge 102, wherein the shape and the size of the bulge 102 is compatible to the hole 110 of the baseboard 11. One side of the bulge 102 further comprises a chamfer 100. The height of the chamfer 100 is as adaptive with thickness of the baseboard 11. The supporting board 12 is connected in parallel to the baseboard 11 by four elastic elements 120a, 120b, 120c, and 120d such as torsion springs which provide a supporting force and an elastic force when the peripheral element 10 and baseboard 11 are connected and separated with each other, respectively. In an embodiment, the baseboard 11 is a shell of an electronic device (e.g. a laptop or a cell phone). The peripheral element 10 is a peripheral device of the electronic device such as a display, a multimedia operation interface or a network phone.

Figure 2:
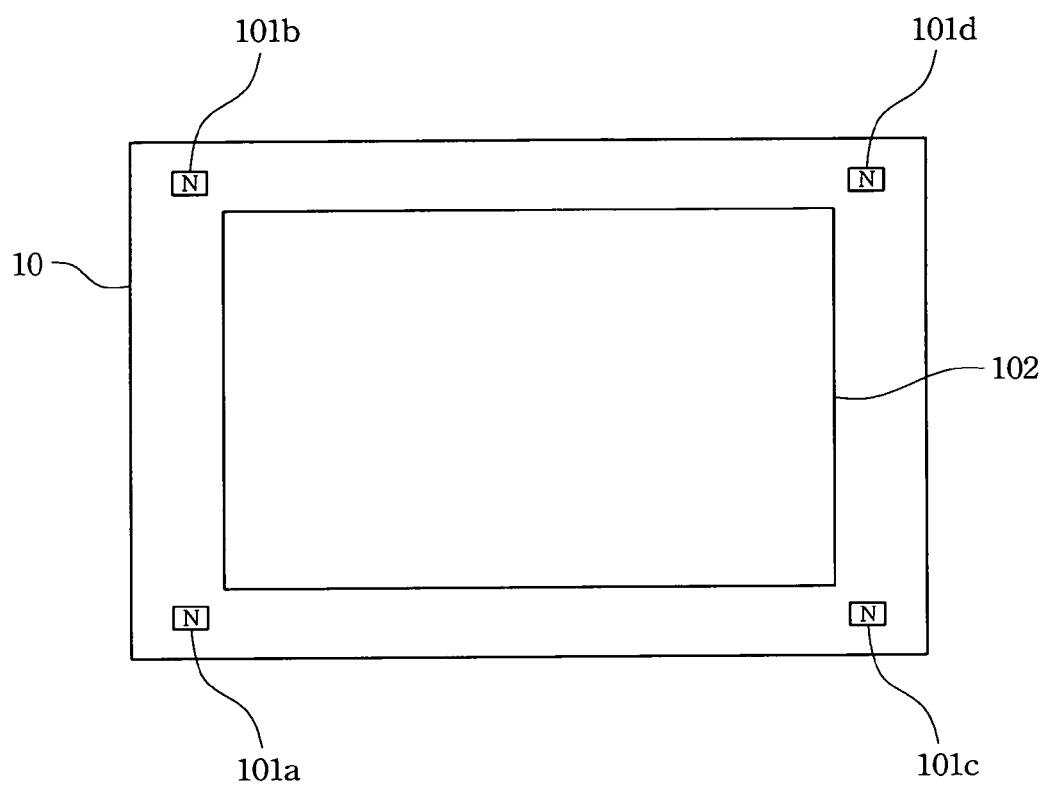
FIG. 2 is a bottom top view of the peripheral element according to one embodiment of this invention.

Please refer to FIG. 2 at the same time, wherein FIG. 2 is a bottom view of the peripheral element 10 of the present invention. The four first magnetic connecting elements 101a, 101b, 101c and 101d, for example magnets, are placed on the four corners of the peripheral element 10 as shown in FIG. 2 with N-pole sides of the magnets. The four second magnetic connecting elements 111a, 111b, 111c and 111d are placed around (on the four corners for example) the hole 110 of the baseboard 11 corresponding to the position of the four first magnetic connecting elements 101a, 101b, 101c and 101d; each of the second magnetic connecting elements 111a, 111b, 111c and 111d comprises one magnet or two adjacent magnetic elements with opposite polarity arrangement as shown in FIG. 1, wherein the left side is S-pole and the right side is N-pole. People skilled in the art can easily modify the number and the placement of the first and second magnetic connecting elements described above, and the first and second magnetic connecting elements are not necessarily magnets and can be replaced by other magnetic material.

Figure 3:
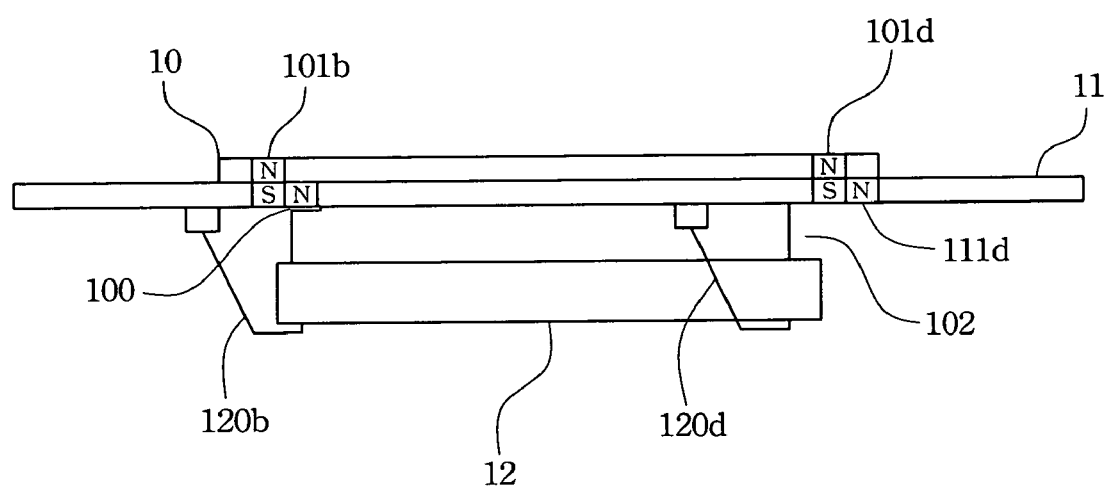
FIG. 3 is a side view of a conjunctive structure according to one embodiment of this invention.

For connecting the baseboard 11 with the peripheral element 10, the bulge 102 of the peripheral element 10 has to be aligned to the hole 110 of the baseboard 11 first and then push the bulge 102 into the hole 110 to make the N-pole sides of the four first magnetic connecting elements 101a, 101b, 101c and 101d face to the N-pole side (right side) of the second magnetic connecting elements 111a, 111b, 111c and 111d, respectively. At the same time, the repulsion forces the peripheral element 10 to move to the S-pole side (left side)

attractive to the four first magnetic connecting elements 101a, 101b, 101c and 101d. The baseboard 11 and peripheral element 10 are therefore connected to each other. FIG. 3 is a side view of the conjunctive structure 1 after being connected. After the four first magnetic connecting elements 101a, 101b, 101c and 101d are respectively attracted to the S-pole sides of the second magnetic connecting elements 111a, 111b, 111c and 111d, the chamfer 100 on the bulge 20 102 of the peripheral element 10 the baseboard 11 would fit with the baseboard 11, thus the connection of the baseboard 11 and the peripheral element 10 could be enhanced. Besides, the elastic elements 120a, 120b, 120c and 120d are stretched due to the pressure or push of the bulge 102 of the peripheral element 10, thus further support the peripheral element 10.

For separating the baseboard 11 and the peripheral element 10, the peripheral element 10 has to be pushed transversely to force the chamfer 100 of the bulge 102 out of the baseboard 11. The four first magnetic connecting elements 101a, 101b, 101c and 101d thus displace from facing the S-pole sides of the second magnetic connecting elements 111a, 111b, 111c and 111d to face the N-pole sides of the second magnetic connecting elements 111a, 111b, 111c and 111d. Therefore, a repulsive force is generated and the elastic elements 120a, 120b, 120c and 120d provide elastic forces at the same time to push out the peripheral element 10 from the hole 110 of the baseboard 10.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A conjunctive structure comprising:
   a baseboard, a hole being formed that penetrates completely through the baseboard;
   a peripheral element comprising a bulge, wherein a shape and a size of the bulge are compatible to the hole in the baseboard;
   a connecting apparatus comprising:
      at least one first magnetic connecting element placed on at least one corner of the peripheral element;
      at least one second magnetic connecting element placed around the hole of the baseboard corresponding to the at least one first magnetic connecting element,
   wherein the at least one second magnetic connecting element comprises two adjacent magnetic elements with opposite polarity arrangement;
   a supporting board placed parallel with the baseboard; and
   a plurality of elastic elements for connecting the supporting board and the baseboard,
   wherein when the peripheral element is connected to the baseboard such that the bulge of the peripheral element is pushed into the hole of the baseboard, the at least one first magnetic connecting element and the at least one second magnetic connecting element attract each other, and when the peripheral element is pushed transversely to be separated from the baseboard, at least one first magnetic connecting element and the at least one second magnetic connecting element repulse each other.

2. The conjunctive structure of claim 1, wherein a side of the bulge of the peripheral element has a chamfer.

3. The conjunctive structure of claim 2, wherein when the peripheral element is connected to the baseboard, the baseboard is adapted to the chamfer on the bulge of the peripheral element.

4. The conjunctive structure of claim 1, wherein when the peripheral element is separated from the baseboard, the plurality of elastic elements provide elastic forces to push out the peripheral element from the baseboard.

5. The conjunctive structure of claim 3, wherein when the peripheral element is separated from the baseboard, the plurality of elastic elements provide elastic forces to push out the peripheral element from the baseboard.

* * * * *